United States Patent [19]

Hirako et al.

[11] Patent Number: 4,865,175
[45] Date of Patent: Sep. 12, 1989

[54] DEVICE FOR HOLDING BRAKING FORCE FOR VEHICLE

[75] Inventors: Atsushi Hirako, Yokohama; Yuki Sasa, Tokyo, both of Japan

[73] Assignee: Isuzu Motors Limited, Tokyo, Japan

[21] Appl. No.: 138,701

[22] Filed: Dec. 28, 1987

[30] Foreign Application Priority Data

Dec. 27, 1986 [JP] Japan .................. 61-315286

[51] Int. Cl.$^4$ ........................................... B60K 41/20
[52] U.S. Cl. ................................... 192/1.23; 192/1.33; 192/1.35
[58] Field of Search ............... 192/1.23, 1.32, 1.33, 192/1.34, 1.35; 180/197

[56] References Cited

U.S. PATENT DOCUMENTS

| | | | |
|---|---|---|---|
| 2,235,412 | 3/1941 | Weiss et al. | 192/1.33 |
| 3,870,119 | 3/1975 | Wurst | 192/1.33 |

FOREIGN PATENT DOCUMENTS

| | | |
|---|---|---|
| 0131411 | 1/1985 | European Pat. Off. . |
| 2305690 | 1/1975 | Fed. Rep. of Germany ..... 192/1.35 |

OTHER PUBLICATIONS

Patent Abstracts of Japan, vol. 10, No. 37 (M-453) [2094], 60-189665, Feb. 14, 1986.

*Primary Examiner*—Leslie A. Braun
*Assistant Examiner*—David A. Testardi
*Attorney, Agent, or Firm*—Staas & Halsey

[57] ABSTRACT

A device for holding the braking force of a motor vehicle has a braking force holding valve in a brake operating fluid circuit. The device ascertains whether a load is imposed on an engine of the motor vehicle based on detected signals indicating the amount of depression of an accelerator pedal and the rotational speed of the engine. When there is a load acting on the engine, the braking force holding device is opened to release a braking force.

4 Claims, 3 Drawing Sheets

Fig. I

DEVICE FOR HOLDING BRAKING FORCE FOR VEHICLE

BACKGROUND OF THE INVENTION

The present invention relates to a device for holding the braking force of a motor vehicle to allow the driver to start the motor vehicle on an uphill road easily.

When a motor vehicle stopped on an uphill road starts to move uphill, the driver has to coordinate the braking mechanism, accelerator pedal, and clutch of the motor vehicle to start the motor vehicle, without allowing the motor vehicle to move back and without stopping the engine.

Since such a starting process requires the driver to be highly skilled, there is a demand in the market for a motor vehicle which can easily be started on an uphill road.

To meet such a demand, the applicant has proposed a braking force retaining control apparatus as disclosed in Japanese Laid-Open Patent Publication No. 60-12360.

The disclosed braking force retaining apparatus is used on a motor vehicle having an automatic transmission with a friction clutch, which is controlled by an electronic control unit. The braking force retaining apparatus receives signals from various detectors for detecting operating conditions of the vehicle to retain a braking force when the vehicle is stopped by operating the brake. When the motor vehicle is to be started, the braking force is retained or held until the clutch is engaged by a clutch actuator. By retaining the braking force, the motor vehicle is allowed to restart on an uphill road smoothly without requiring skill on the part of the driver.

In the disclosed braking force retaining apparatus, when the motor vehicle is to be started, the operating condition of the friction clutch, i.e., a partly engaged position of the clutch is detected by a signal indicative of the amount of engagement of the clutch. When the torque of the engine is transmitted to the wheels through the clutch and a drive mechanism, a braking force holding valve which is a braking force holding mechanism disposed in a brake operating fluid circuit is opened to release the braking force. However, the above proposal cannot be incorporated in motor vehicles with manually operated transmissions since such motor vehicles have no means for detecting the amount of engagement of the clutch and hence a partly engaged clutch position cannot be detected. Another problem is that it is costly to equip a motor vehicle with means for detecting the amount of engagement of the clutch.

SUMMARY OF THE INVENTION

It is an object of the present invention to provide a device for holding the braking force of a motor vehicle, the device having a braking force holding valve disposed in a brake operating fluid circuit and openable based on the load imposed on the engine at the time of starting the motor vehicle, but not on the amount of engagement of the clutch, so that the device is inexpensive and can be incorporated in a motor vehicle with a manually operated transmission.

According to the present invention, there is provided a device for holding the braking force of a motor vehicle, having a braking force holding valve disposed in a brake operating fluid circuit, and an electronic control unit for controlling operation of the braking force holding valve based on an operating condition of the motor vehicle, the device comprising means for detecting the rotational speed of an engine mounted on the motor vehicle, means for detecting the amount of depression of an accelerator pedal which controls operation of the engine, and control means for controlling operation of the braking force holding valve based on a load imposed on the engine and detected by an engine rotational speed signal and an accelerator depression signal which are supplied from both of the detecting means.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
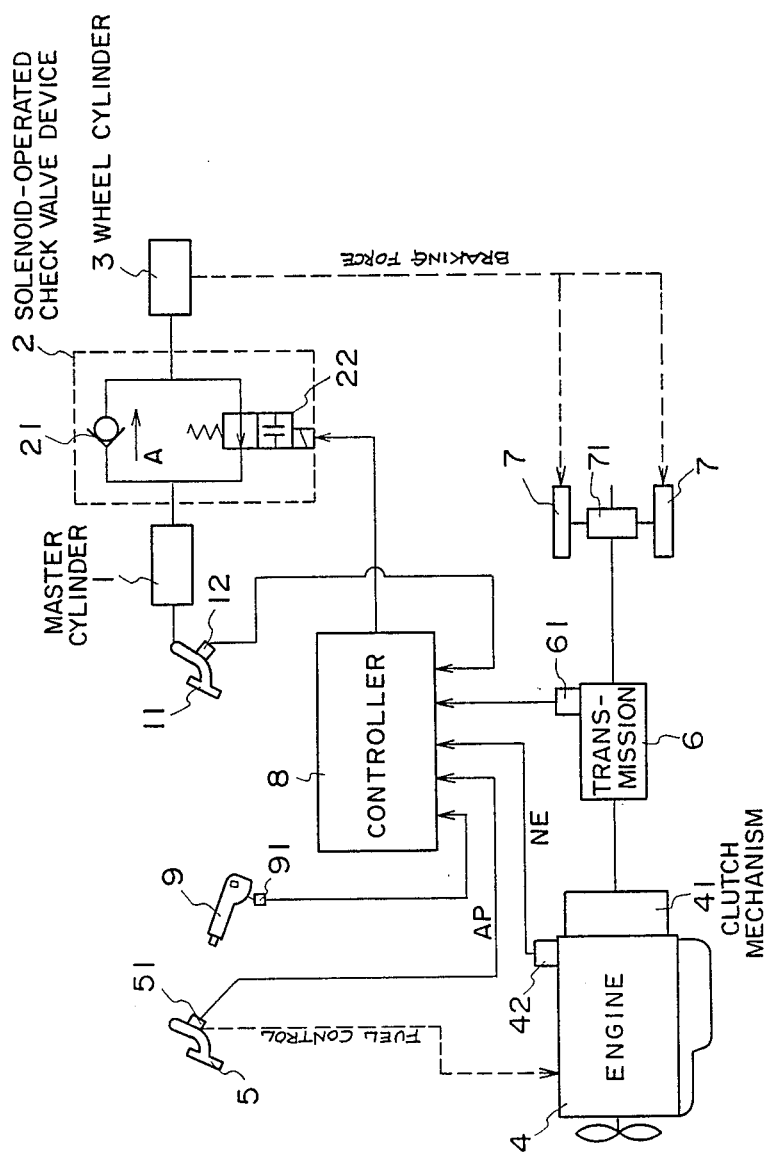
FIG. 1 is a block diagram of a braking force holding device according to an embodiment of the present invention.

As shown in FIG. 1, a master cylinder 1 operable by a brake pedal 11 serves as a hydraulic pressure source for a hydraulic brake mechanism in response to depression of the brake pedal 11. The master cylinder 1 supplies hydraulic pressure via a solenoid-operated check valve device 2 serving as a braking force holding valve to a wheel cylinder 3 to brake vehicle wheels. The solenoid-operated check valve device 2 disposed in a hydraulic circuit between the master cylinder 1 and the wheel cylinder 3 has a check valve 21 and a solenoid-operated shutoff valve 22. The check valve 21 allows working oil to flow in the direction of the arrow A, but cuts off an oil flow in the opposite direction. The solenoid-operated shutoff valve 22 is normally open to allow an oil flow thereacross, but cuts off such an oil flow when actuated. Under normal condition, therefore, when the brake pedal 11 is depressed, a pressure buildup developed in the master cylinder 1 is applied via the check valve 1 and the solenoid-operated shutoff valve 22 to the wheel cylinder 3 to apply a braking force to the wheels. When the solenoid-operated shutoff valve 22 is energized, since the oil flow passage thereacross is closed, oil pressure applied from the master cylinder 1 to the wheel cylinder 3 is prevented from returning to the master cylinder 1 by the check valve 21 and is held in the wheel cylinder 3 to keep the wheel braked.

An engine 4 is supplied with fuel at a rate dependent on the depression of the accelerator pedal 5. Power generated by the engine 4 is transmitted through a clutch mechanism 41 to a transmission 6. The amount of depression of the accelerator pedal 5 is detected by an accelerator sensor 51. The speed of rotation of the engine 4 is detected by an engine rotation sensor 42. The accelerator sensor 51 and the engine rotation sensor 42 transmit detected signals AP, NE to a controller 8 (described later).

The transmission 6 is shifted to a desired gear position by a change lever (not shown) and transmits power from the engine 4 to a final speed reducer 71. The power transmitted to the final speed reducer 71 is then transmitted to the wheels 7 for driving the motor vehicle. A vehicle speed sensor 61 detects the rotational speed of the output shaft of the transmission 6 and applies a signal commensurate with the vehicle speed to the controller 8.

The controller 8 comprises a microcomputer including a central processing unit for processing output signals from various sensors, memories for storing results of signal processing operation of the central processing unit, and an input/output device. The controller 8 is supplied with signals from the accelerator sensor 51, the engine rotation sensor 42, and the vehicle speed sensor 61, and also with a detected signal from a brake sensor 12 which detects the amount of depression of the brake pedal 11 and a detected signal from a parking brake switch 91 which detects whether a parking brake lever 9 is operated. The controller 8 is electrically connected to the solenoidoperated check valve device 2 and transmits a control signal thereto.

Figure 2:
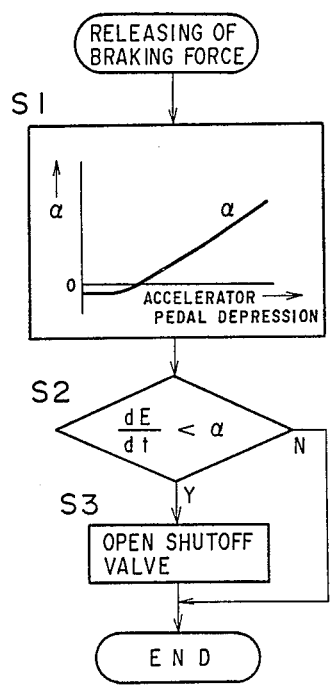
FIG. 2 is a flowchart of a processing sequence of a mode of operation of the braking force holding device at the time of starting a motor vehicle.

FIG. 2 shows a mode of operation of the braking force holding device when the motor vehicle is started. The processing sequence shown in FIG. 2 is effected from the time when the brake is operated to stop the vehicle and the solenoid-operated shutoff valve 22 is actuated to hold the braking force to the time when the braking force is released to start the vehicle. The operation will be described in detail with reference to FIG. 2.

The memory of the controller 8 stores a control map containing variables $\alpha$ corresponding to increases in the rotational speed of the engine at the time of increasing the amount of depression of the accelerator pedal (accelerator opening) when no load is applied to the engine, i.e., the clutch is disengaged.

First, based on the detected signal AP from the accelerator sensor 51, a step S1 finds from the control map a variable $\alpha$ corresponding to an increase in the engine rotational speed according to the accelerator opening.

In a step S2, the detected signal AP from the accelerator sensor 51 and the detected signal NE from the engine rotation sensor 42 are read into the controller 8; a rate of change in a small fraction of time (dE/dt) of the increase in the engine rotation speed NE to the increase in the accelerator pedal depression signal AP is determined, and the rate of change is compared with the variable $\alpha$. If dE/dt is smaller than $\alpha$, it is determined that the clutch has started to be engaged and a load is imposed on the engine, and control goes to a step S3. In the step S3, a command is applied to actuate the solenoid-operated shutoff valve 22 to open the flow passage thereof for thereby releasing the braking force.

If dE/dt is not smaller than the variable $\alpha$, then it is determined that no load acts on the engine and the clutch has not started to be engaged, and hence the solenoid-operated shutoff valve 22 is not opened.

Figure 3:
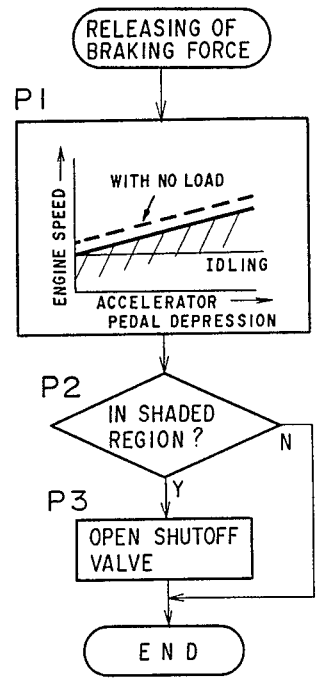
FIG. 3 is a flowchart of a processing sequence of another mode of operation of the braking force holding device.

FIG. 3 shows a processing sequence of another mode of operation of the braking force holding device.

The memory of the controller 8 stores a control map containing, in a graph shown at a step Pl with a vertical axis indicating engine rotational speeds and a horizontal axis indicating amounts of depression of the accelerator pedal, the relationship (represented by the dotted line) between the engine rotation signal NE and the accelerator depression signal AP when the clutch is disengaged and the engine undergoes no load, and also containing such relationship when the engine is subjected to a load.

When starting the motor vehicle, the detected signal AP from the accelerator sensor 51 and the detected signal NE from the engine rotation sensor 42 are read into the controller 8, and the control map shown in the step P1 is searched to check whether the relationship is in the shaded region or not in a step P2. If in the shaded region, then it is determined that the engine is subjected to a load, and control goes to a step P3 in which the solenoidoperated shutoff valve 22 is opened to release the braking force.

If the relationship between the amount of depression of the accelerator pedal and the engine rotational speed is not within the shaded region, then it is determined that no load acts on the engine and the clutch has not started to be engaged, and hence the solenoid-operated shutoff valve 22 remains closed.

In the examples shown in FIGS. 2 and 3, the solenoid-operated shutoff valve 22 is controlled so as to be opened at the time of starting the motor vehicle. The solenoid-operated shutoff valve 22 may be opened when it is determined that the braking force of the parking brake 9 is released based on the detected signal from the parking brake switch 91.

Figure 4:
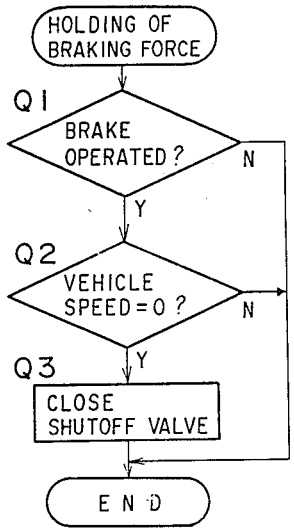
FIG. 4 a flowchart of a processing sequence of operation for holding a braking force.

FIG. 4 shows a processing sequence for holding the braking force with the solenoid-operated check valve device of the invention.

A step Q1 checks whether the brake is operated based on the signal from the brake sensor 12. If the brake is operated, then a step Q2 checks whether the vehicle speed is zero based on the signal from the vehicle speed sensor 61. If the vehicle speed is zero, then the solenoid-operated shutoff valve 22 is closed in a step Q3 to hold the braking force corresponding to the hydraulic pressure acting in the wheel cylinder 3.

The solenoid-operated shutoff valve 22 may be closed to hold the braking force a prescribed time, say 1 to 2 seconds, after the vehicle is stopped or the vehicle speed becomes zero.

Figure 5:
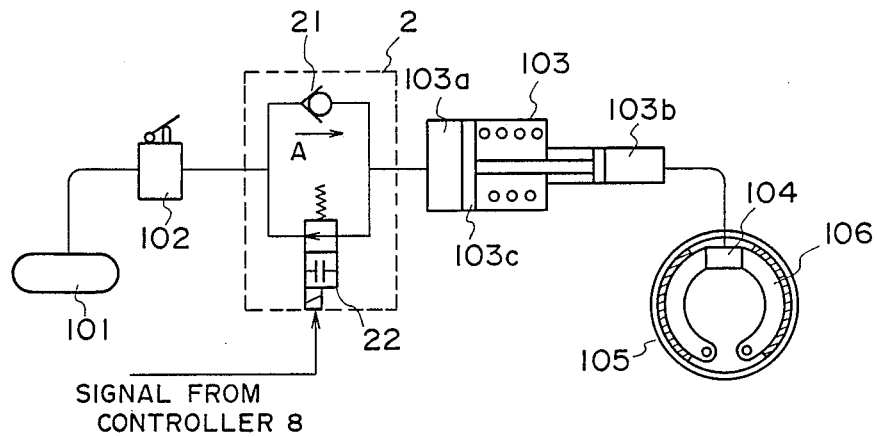
FIGS. 5 and 6 are diagrams of braking force holding devices according to other embodiments of the present invention.
Figure 6:
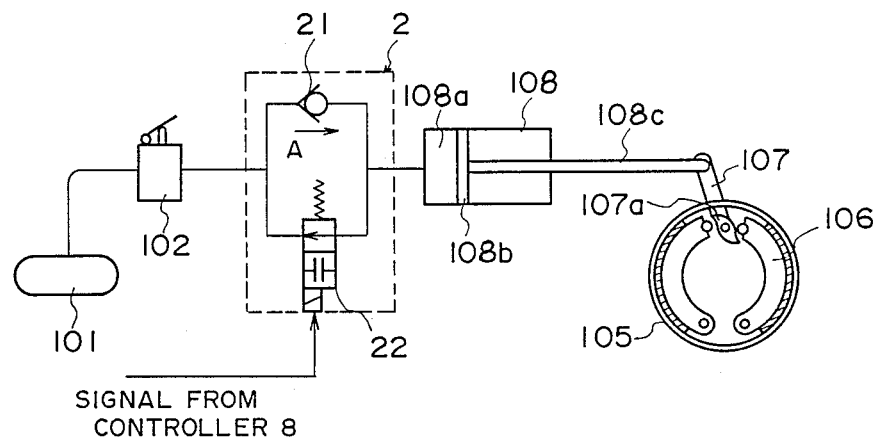

FIGS. 5 and 6 show braking force holding devices according to other embodiments of the present invention. The embodiment in FIG. 5 is incorporated in a brake device employing a booster, and the embodiment of FIG. 6 is combined with an air brake device.

In FIG. 5, an air tank 101 serves as a pressure source, and a brake valve 102 controls air pressure from the air tank 101 in response to depression of a pedal. Air from the brake valve 102 is delivered to a solenoidoperated check valve device 2, which is substantially the same as the check valve device in the preceding embodiment, except that the solenoid-operated check valve device 2 of FIG. 1 is used to control the flow passage of braking oil whereas the solenoid-operated check valve device 2 of FIG. 5 is disposed in an air flow passage for holding air pressure. A booster 103 has a working chamber 103a. When air under pressure is introduced via the brake valve 102 into the working chamber 103a, a piston 103c of the booster 103 is moved to the left in FIG. 5 to deliver working oil under amplified pressure from a hydraulic pressure generating chamber 103b of the booster 103 to a wheel cylinder 104. Brake shoes 106 are now moved to brake a brake drum 105.

In the embodiment of FIG. 6, an air tank 101, a brake valve 102, and a solenoid-operated check valve device device 2 are arranged in the same manner as shown in FIG. 5. An air chamber 108 has a working chamber 108a, which is supplied with air under pressure from the solenoid-operated check valve device 2 to move a piston 108b and a piston rod 108c to the right in FIG. 6. A lever 107 coupled to the piston rod 108c and having an S-shaped cam 107a is thus operated to move brake shoes 106 to apply a braking force to a brake drum 105.

According to each of the embodiments of FIGS. 5 and 6, the solenoid-operated shutoff valve 22 of the solenoid-operated check valve device 2 is opened when the controller 8 detects an engine load and issue a command at the time the vehicle is started, so that the booster 103 or the air chamber 106 is released of the air pressure to release the braking force from the brake drum 105.

With the present invention, as described above, the relationship between the amount of depression of the accelerator pedal and the engine rotational speed at the time the engine has no load is preset, and when starting the vehicle, the change in the engine rotational speed dependent on the change in the increase in the amount of depression of the accelerator pedal is detected. Then, the detected change is compared with that which is preset for no engine load, for thereby detecting the engine load, whereupon the solenoid-operated shutoff valve in the brake operating fluid circuit is opened to release the braking force. It is no longer necessary to have means for detecting the amount of engagement of the clutch and to detect a partly engaged position of the clutch. The braking force holding device of the present invention is thus inexpensive to manufacture, and can easily be incorporated in a motor vehicle with a manually operated transmission having no clutch engagement detecting means.

Although certain preferred embodiments have been shown and described, it should be understood that many changes and modifications may be made therein without departing from the scope of the appended claims.

What we claim is:

1. A device for holding a braking force of a motor vehicle having an accelerator pedal, having an engine mounted thereon, and having a braking force holding valve disposed in a brake operating fluid circuit, and an electronic control unit for controlling operation of the braking force holding valve based on an operating condition of the motor vehicle, said device comprising:
   means for detecting the rotational speed of the engine mounted on the motor vehicle, and for supplying an engine rotational speed signal;
   means for detecting the amount of depression of the accelerator pedal which controls operation of the engine, and for supplying an accelerator depression signal;
   means for storing a control map containing variables corresponding to rates of increase in the rotational speed of the engine with respect to amounts of depression of the accelerator pedal when no load is imposed on the engine;
   means for comparing one of the variables corresponding to the detected amount of depression of the accelerator pedal with a rate of change of the detected rotational speed of the engine; and
   means for opening the braking force holding valve when the rate of change is smaller than the variable.

2. A device according to claim 1, wherein the braking force holding valve comprises:
   a check valve; and
   a solenoid-operated shutoff valve.

3. A device for holding a braking force applied to a motor vehicle having an accelerator pedal, having an engine mounted thereon, and having a braking force holding valve disposed in a brake operating fluid circuit, and an electronic control unit for controlling operation of the braking force holding valve based on an operating condition of the motor vehicle, said device comprising:
   means for detecting the rotational speed of the engine mounted on the motor vehicle, and for supplying an engine rotational speed signal;
   means for detecting the amount of depression of the accelerator pedal which controls operation of the engine, and for supplying an accelerator depression signal;
   means for storing a control map containing a range of rotational speed of the engine corresponding to amounts of depression of the accelerator pedal when the engine undergoes a load;
   means for ascertaining whether the detected rotational speed of the engine based on the engine rotational speed signal with respect to the detected amount of depression of the accelerator pedal based on the accelerator depression signal falls in the range; and
   means for opening the braking force holding valve when the detected rotational speed of the engine with respect to the detected amount of depression of the accelerator pedal falls in the range.

4. A device according to claim 3, wherein the braking force holding valve comprises:
   a check valve; and
   a solenoid-operated shutoff valve.

* * * * *